(12) United States Patent
Randall et al.

(10) Patent No.: US 12,474,466 B2
(45) Date of Patent: Nov. 18, 2025

(54) LOCATING A MOBILE RADIO-ENABLED TAG

(71) Applicant: Entotem Limited, Derby (GB)

(72) Inventors: Andrew Paul George Randall, Newbury (GB); David Ian Belcher, Wantage (GB); Alastair Bryers, Cholsey (GB); Andrew James Maxim, Andover (GB)

(73) Assignee: Entotem Limited, Derby (GB)

( * ) Notice: Subject to any disclaimer, the term of this patent is extended or adjusted under 35 U.S.C. 154(b) by 364 days.

(21) Appl. No.: 18/139,307

(22) Filed: Apr. 25, 2023

(65) Prior Publication Data

US 2023/0350052 A1    Nov. 2, 2023

(30) Foreign Application Priority Data

Apr. 29, 2022    (GB) ...................................... 2206308

(51) Int. Cl.
  *G01S 13/87*    (2006.01)
(52) U.S. Cl.
  CPC .................................. *G01S 13/878* (2013.01)
(58) Field of Classification Search
  CPC .................................................... G01S 13/878
  USPC ...................................................... 342/125
  See application file for complete search history.

(56) References Cited

U.S. PATENT DOCUMENTS

| | | | | |
|---|---|---|---|---|
| 7,545,281 B2 * | 6/2009 | Richards | .................. | G01S 1/20 340/573.3 |
| 8,750,793 B2 | 6/2014 | Tysowski | | |
| 9,313,135 B2 * | 4/2016 | Booij | ...................... | H04L 47/25 |
| 9,846,220 B2 * | 12/2017 | Kong | .................... | G01S 5/0226 |
| 9,936,363 B2 * | 4/2018 | Diamond | ................. | H04W 4/33 |
| 10,104,508 B2 * | 10/2018 | Kong | .................... | H04W 64/00 |
| 10,666,700 B2 * | 5/2020 | Afzelius | ................. | H04W 4/02 |
| 10,942,250 B2 * | 3/2021 | Bartov | ................. | G01S 13/878 |
| 11,350,381 B2 * | 5/2022 | Truong | ................ | H04W 16/18 |
| 11,539,681 B2 * | 12/2022 | Nix | ......................... | H04W 4/70 |
| 11,902,928 B2 * | 2/2024 | Kim | ........................ | H04W 24/10 |
| 2002/0019238 A1 * | 2/2002 | McDonnell | ............. | G01S 13/74 455/456.5 |
| 2004/0119641 A1 * | 6/2004 | Rapeli | ..................... | G01S 13/74 342/450 |
| 2005/0243781 A1 * | 11/2005 | Vesuna | ................. | H04W 64/00 370/338 |
| 2007/0001867 A1 * | 1/2007 | Rowe | ....................... | G01S 5/02 340/8.1 |

(Continued)

FOREIGN PATENT DOCUMENTS

| | | | | |
|---|---|---|---|---|
| EP | 1937020 A2 * | 6/2008 | ......... | G08B 21/0272 |
| EP | 2724570 B1 * | 4/2015 | ............. | H04L 69/18 |

(Continued)

OTHER PUBLICATIONS

Corresponding Great Britain Patent Application No. GB 2206308.5, Search Report, dated Sep. 30, 2022.

*Primary Examiner* — Nuzhat Pervin
(74) *Attorney, Agent, or Firm* — Cooper Legal Group LLC

(57) ABSTRACT

The locating of a mobile radio-enabled tag, in which a radio network has fixed radio transceivers configured to operate under a first radio protocol (602) to identify the vicinity of a tag. In addition, a portable radio receiver is configured to locate the position of the tag in the identified vicinity using a second radio protocol (603).

16 Claims, 16 Drawing Sheets

(56) References Cited

U.S. PATENT DOCUMENTS

| | | | | |
|---|---|---|---|---|
| 2010/0141430 | A1* | 6/2010 | Steer | G06Q 10/08 |
| | | | | 340/539.13 |
| 2013/0064197 | A1* | 3/2013 | Novak | H04W 72/542 |
| | | | | 370/329 |
| 2013/0300541 | A1* | 11/2013 | Pesonen | G01S 5/0289 |
| | | | | 340/10.1 |
| 2015/0029924 | A1* | 1/2015 | Booij | H04L 69/18 |
| | | | | 370/312 |
| 2016/0205027 | A1* | 7/2016 | Booij | H04L 69/18 |
| | | | | 370/312 |
| 2016/0262113 | A1* | 9/2016 | Diamond | H04W 56/0015 |
| 2017/0187845 | A1* | 6/2017 | Booij | H04W 4/06 |
| 2018/0014241 | A1* | 1/2018 | Perdomo | H04W 12/08 |
| 2018/0279253 | A1* | 9/2018 | Knoblauch | H04W 64/00 |
| 2020/0021531 | A1* | 1/2020 | Booij | H04L 12/189 |
| 2020/0137715 | A1* | 4/2020 | Edge | G01S 5/06 |
| 2020/0205115 | A1* | 6/2020 | Zhao | H04W 64/003 |
| 2022/0039049 | A1* | 2/2022 | Randall | H04B 17/318 |
| 2024/0085516 | A1* | 3/2024 | Zamora Cadenas | H04W 4/029 |
| 2025/0166081 | A1* | 5/2025 | Vidal | G06Q 40/08 |

FOREIGN PATENT DOCUMENTS

| | | | | |
|---|---|---|---|---|
| EP | 2903352 | A1 * | 8/2015 | H04W 4/06 |
| EP | 1571867 | B1 * | 5/2019 | H04W 12/30 |
| GB | 2570479 | A | 7/2019 | |
| GB | 2604171 | A * | 8/2022 | H04W 64/00 |

\* cited by examiner

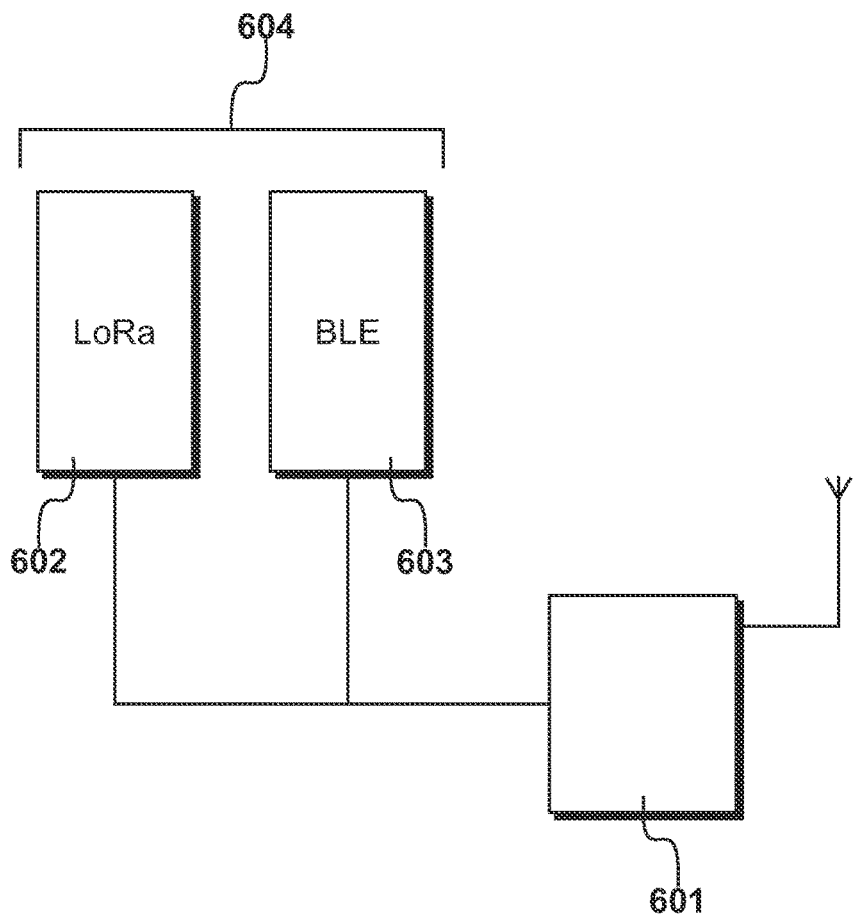
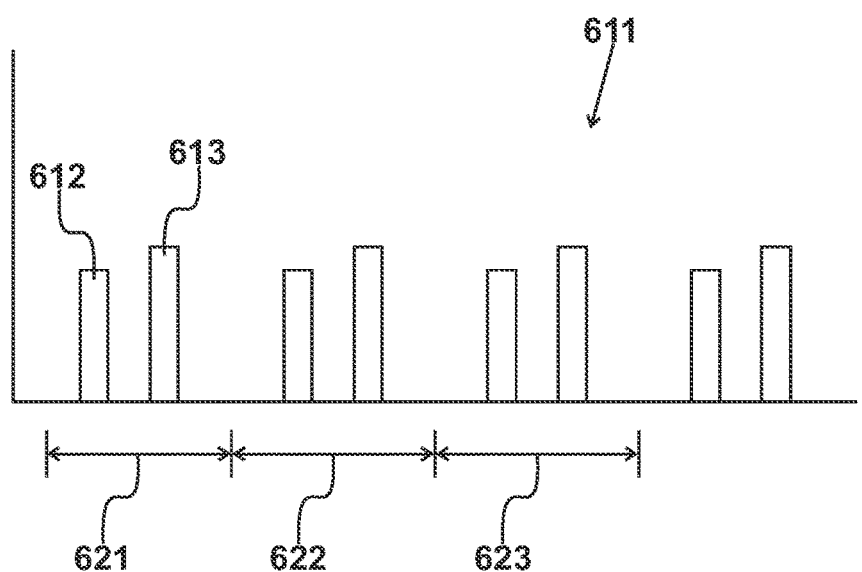
Fig. 6

LOCATING A MOBILE RADIO-ENABLED TAG

CROSS REFERENCE TO RELATED APPLICATIONS

This application claims priority from United Kingdom Patent Application number 2206308.5, filed on Apr. 29, 2022, the whole contents of which are incorporated herein by reference.

TECHNICAL FIELD

The present invention relates to a method of locating a mobile radio enabled tag. The present invention also relates to an apparatus for locating a mobile radio enabled tag.

BACKGROUND OF THE INVENTION

A method of assessing distances between a first transceiver and a second transceiver by measuring a round trip time of flight of a transmitted radio signal is disclosed in US 2022/39049A1. Furthermore, having assessed these different distances, procedures are disclosed for locating the actual position of radio enabled tags.

Techniques are also disclosed for improving the accuracy of assessing these distances, with an aim of improving location reliability. For example, in one proposal, transmitter power is increased if an intensity is below a first threshold and this transmitter power is decreased if the intensity is above a second threshold in order to reduce the introduction of ranging errors due to automatic step changes being made to input amplification.

Fixed transceivers within a radio network may be identified as anchors, with distances being determined between these anchors and the mobile tags. In US 2022/39049A1, round-trip time-of-flight measurements are made to determine distances between anchors and tags, although it is appreciated that alternative radio protocols could be deployed to achieve a similar effect. However, experiment has confirmed that the accuracy of positions determined by this approach is highly influenced by the density of the anchors that are provided within the environment. Thus, for example, in a building, two anchors may be provided in each room but outside the distance between anchors may be between fifty metres and one hundred metres.

It is also appreciated that in order to improve location accuracy, a greater number of line-of-sight ranges are required, given that reflections and other disturbances to radio signals will introduce errors.

Thus, it has been appreciated that any required level of accuracy can be achieved provided than a sufficient number of anchors are installed within the environment. However, this can introduce further impracticalities and, in particular, the total cost of installation, due to the excessive use of anchors, may become a serious deterrent in terms of selecting a system of this type.

BRIEF SUMMARY OF THE INVENTION

According to a first aspect of the present invention, there is provided a method of locating a mobile radio-enabled tag, comprising the steps of: identifying the vicinity of the tag in a radio network having fixed radio transceivers using a first radio protocol, in which said fixed radio transceivers continually perform ranging exchanges with a plurality of mobile radio-enabled tags in an environment; and locating the position of the tag in said vicinity by means of a portable radio receiver using a second radio protocol, in which a message issued to the tag to locate is instructed by a fixed radio transceiver under the first radio protocol to broadcast a location signal in accordance with the second radio protocol.

In an embodiment, a message is sent to a tag to broadcast a radio signal in accordance with the second radio protocol and it is possible for this message to be sent over the radio network in accordance with the first radio protocol. Thus, in this way, the first radio protocol maintains control over the network as a whole and the second radio protocol is only introduced for locating a specific tag known to be in a particular vicinity.

According to a second aspect of the present invention, there is provided an apparatus for locating a mobile radio-enabled tag, comprising: a radio network having a plurality of fixed radio transceivers configured to operate under a first radio protocol to identify the vicinity of a tag in said radio network; and a portable radio receiver configured to locate the position of the tag in said vicinity using a second radio protocol, wherein a network data processor is configured to:
  instruct fixed radio transceivers to continually perform ranging exchanges with a plurality of mobile radio-enabled tags in an environment; and
  having located the vicinity of the mobile radio-enabled tag to be located, issuing a message to said tag via a fixed transceiver under the first protocol to broadcast a location signal in accordance with the second radio protocol.

In an embodiment, the network is configured to operate under the second radio protocol by: broadcasting a signal periodically from the tag having a predetermined transmission signal level; receiving broadcasted signals from the tag at the mobile device; and generating output data at the mobile device indicating the position of the tag with reference to the strength of the broadcasted signals.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

BRIEF DESCRIPTION OF THE SEVERAL VIEWS OF THE DRAWINGS

FIG. 6 shows an abstracted representation of the environment identified in FIG. 5;

DETAILED DESCRIPTION OF EMBODIMENTS OF THE INVENTION

FIG. 1

Figure 1:
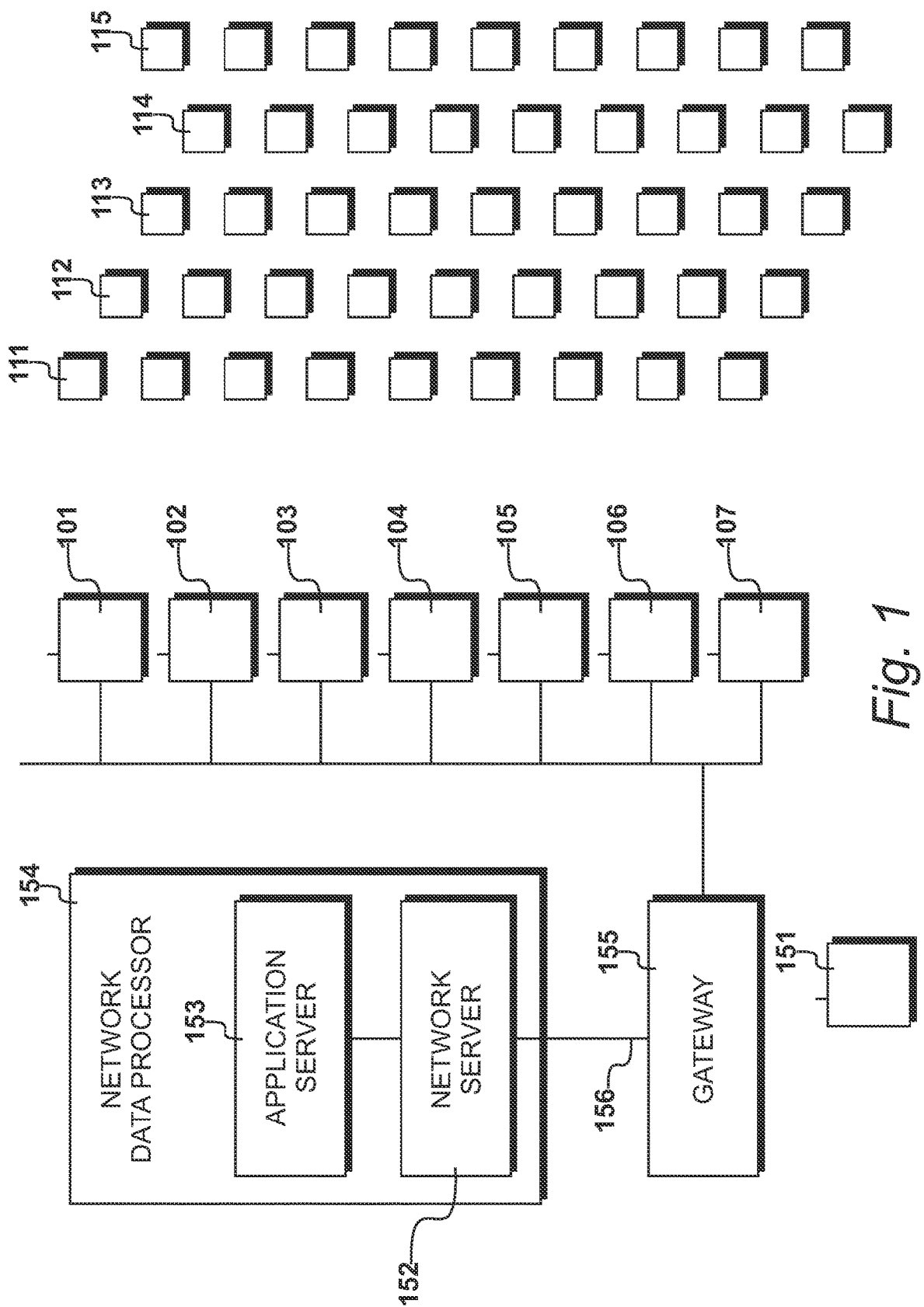
FIG. 1 shows an apparatus for locating a mobile radio enabled tag.

An apparatus for locating a mobile radio enabled tag is shown in FIG. 1. The apparatus provides for the establishment of a radio network having fixed radio transceivers, of which seven are identified in FIG. 1 identified as 101 to 107. However, in many applications, significantly more transceivers of this type may be provided. The radio network is configured to operate under a first radio protocol to identify the vicinity of tags, of which many may be present within the environment, that includes tags 111 to 115 identified in FIG. 1. In addition, there is provided a portable radio receiver 151 configured to locate the position of a tag in a previously identified vicinity using a second radio protocol.

In an embodiment, the first radio protocol is LoRa that may be deployed to locate people and assets in three dimensions, using latitude, longitude and altitude, as described in US 2022/39049. In an embodiment, Semtech SX1280 devices are used that are capable of running a LoRa network at 2.4 GHz; within the standard wireless ISM band. Procedures are provided with these devices that allow time-of-flight measurements to be made between two radio receivers.

Control instructions may be retained in cloud-based systems or may be supported by local hardware, as illustrated in FIG. 1. The embodiment of FIG. 1 includes a network server 152 and an application server 153 which collectively may be identified as a network data processor 154.

A gateway 155 provides translation between an internet protocol network 156 and the LoRa radio network. Devices within the LoRa network transmit packets that support different classes of device within the network. When a device first appears, it joins as a class A device. It has its radio off for most of the time, unless transmitting a packet to the gateway 155. The device has a transmit window and must then wait a predetermined time to allow for two receive windows. The network server can only transmit to a class A device after the class A device has first transmitted to the network server 152. The network server 152 can then only transmit to the device during the receive windows. In accordance with this protocol, the gateway 155 produces a synchronising signal that is transmitted every one hundred and twenty-eight seconds and is itself synchronized to GPS time.

In addition to class A device behaviour, class B devices align their reception windows to ping slots that are determined by the gateway 155. A class B device is informed of the ping slots and, at the correct time, puts on its receiver and listens for packets from the gateway. In this embodiment, all of the devices within the environment comprising the anchors 101 to 107 and the tags 111, 112 etc are class B devices.

FIG. 2

Figure 2:
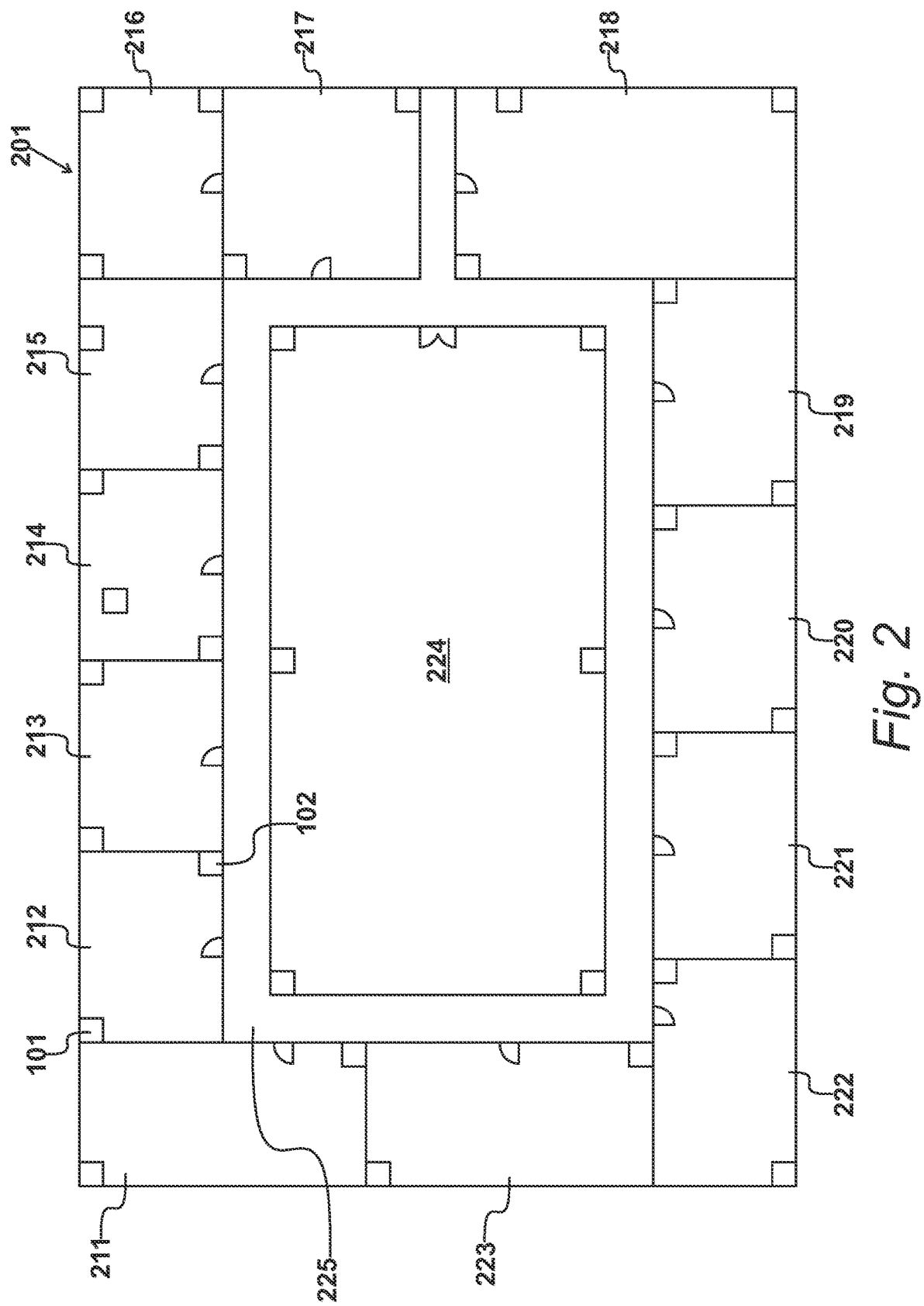
FIG. 2 shows the apparatus of FIG. 1 deployed within a building.

The apparatus described with reference to FIG. 1 is shown deployed within a building in FIG. 2. A floor plan 201 for a particular floor of the building is shown in FIG. 2. The floor includes individual rooms comprising a first room 211, a second 212, a third 213 and so on to room 223, surrounding the perimeter of the floor, along with a central room 224 surrounded by a corridor 225.

In this embodiment, each room includes at least two anchors, with the first anchor 101 and the second anchor 102 located within the second room 212. However, in alternative embodiments, some rooms have only one anchor and some rooms may have no anchors; thereby relaying on anchors in other rooms to determine that a tag is present in the vicinity of a room that itself has no anchors.

FIG. 3

Figure 3:
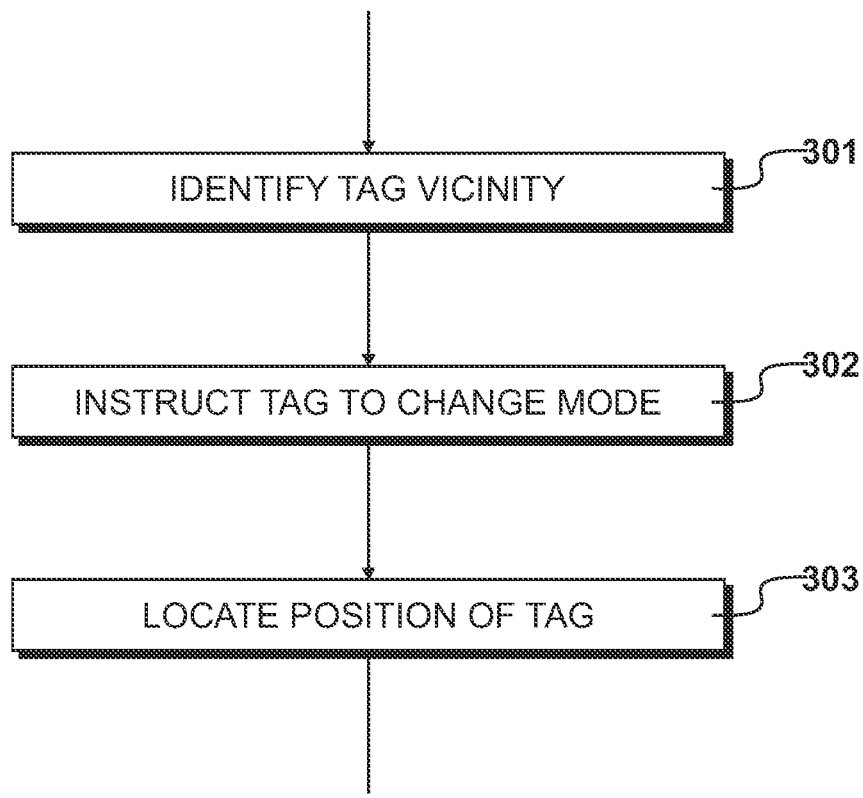
FIG. 3 shows operations performed by a network data processor identified in FIG. 1.

Operations performed by the network data processor 154 are shown in FIG. 3. At step 301 the vicinity of the tag is identified by means of the fixed anchors 101 to 107 (radio transceivers) using the first (LoRa) radio protocol. Each individual tag 111 to 115 etc has a unique identification code thereby allowing it to be addressed by the network and also allowing the network to identify the tag from which a transmission has been received. Thus, in this way, it is possible to transmit data to the tag instructing it to perform ranging operations in accordance with the first radio protocol and also instructing the tag to change mode, such that it is then possible for the tag to operate in accordance with a second protocol.

After identifying the vicinity of a tag, the tag is instructed at step 302 to change its mode of operation. This requires manual intervention, as described with reference to FIG. 14 but allows an operative to physically locate the position of a tag and confirm back to the network data processor 154 that a specific tag has been retrieved. Thus, the actual position of the tag is located at step 303.

FIG. 4

Figure 4:
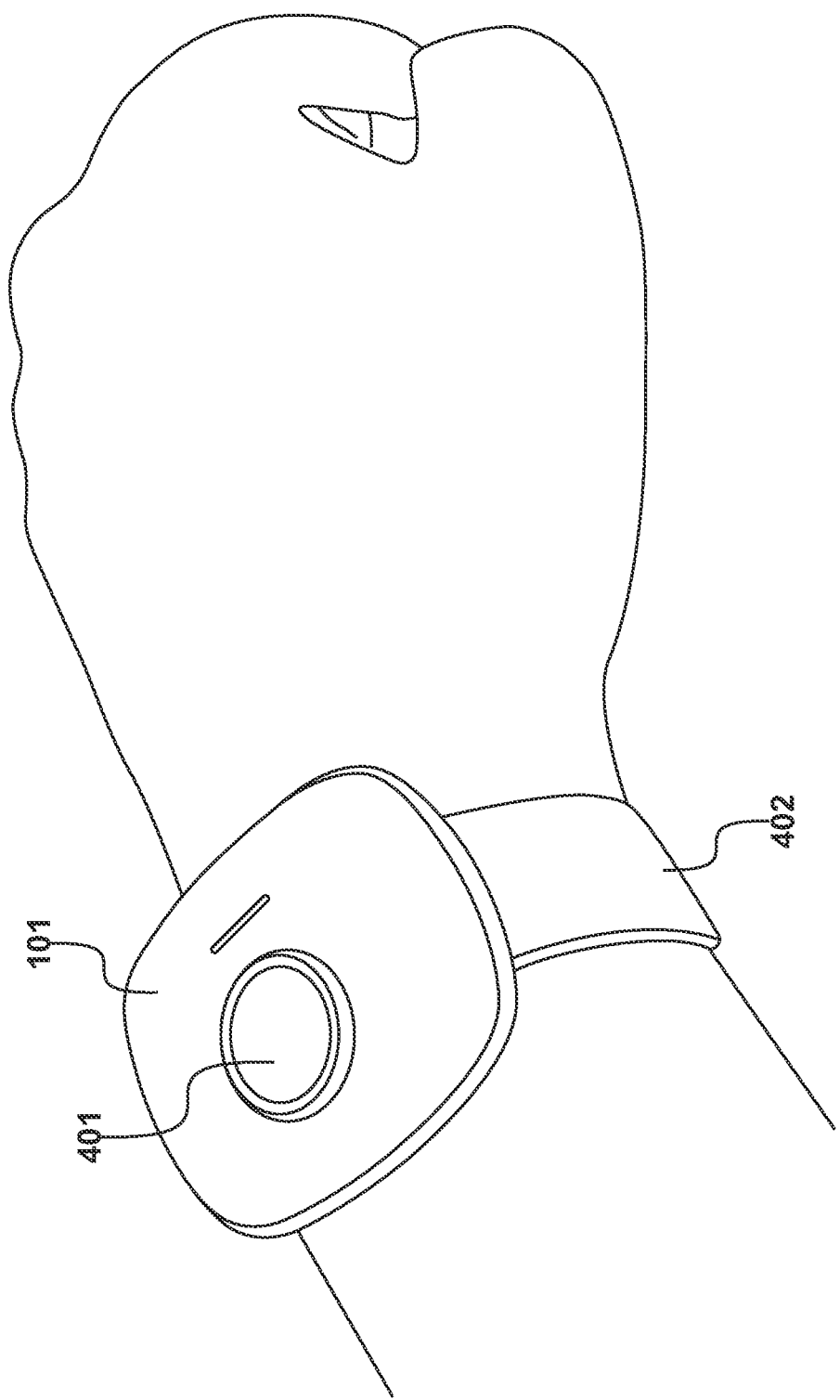
FIG. 4 shows an example of a mobile tag.

An example of a mobile tag 101 is illustrated in FIG. 4. Being mobile, the tag receives energy from a local battery 401.

In this embodiment, during the first mode of operation, the fixed anchors 101 to 107 are each configured as a master and the mobile tags are each configured as a slave. Furthermore, the slave tags are configured to minimize radio transmissions to thereby conserve energy and maximize the operational life of the battery 401.

In the embodiment of FIG. 4, an attachment device 402 is provided for attaching the tag to a person. In alternative applications, a suitable attachment device may be provided for attaching the tag to a physical object.

FIG. 5

Figure 5:
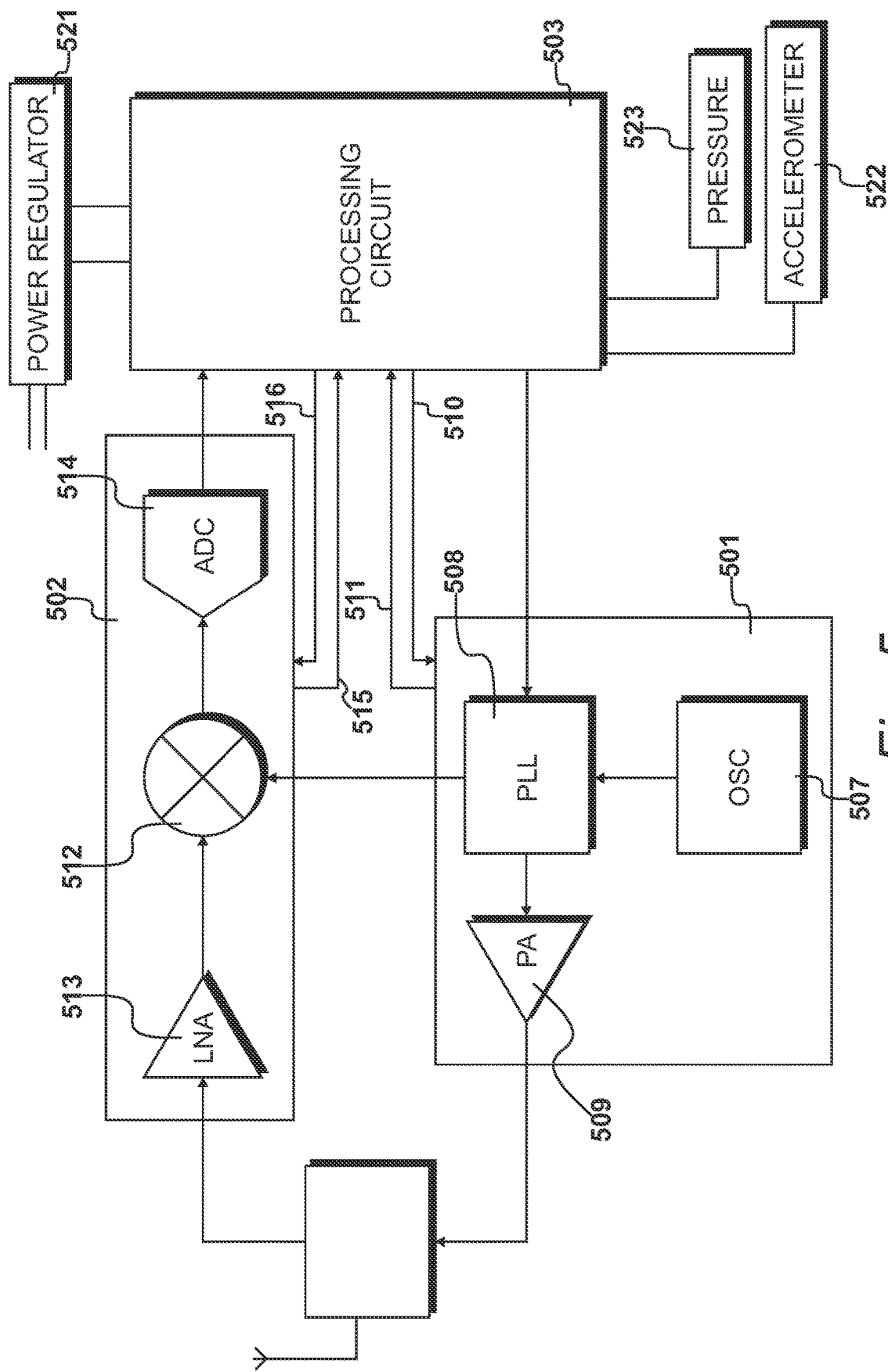
FIG. 5 shows a schematic representation of the tag identified in FIG. 4.
Figure 7:
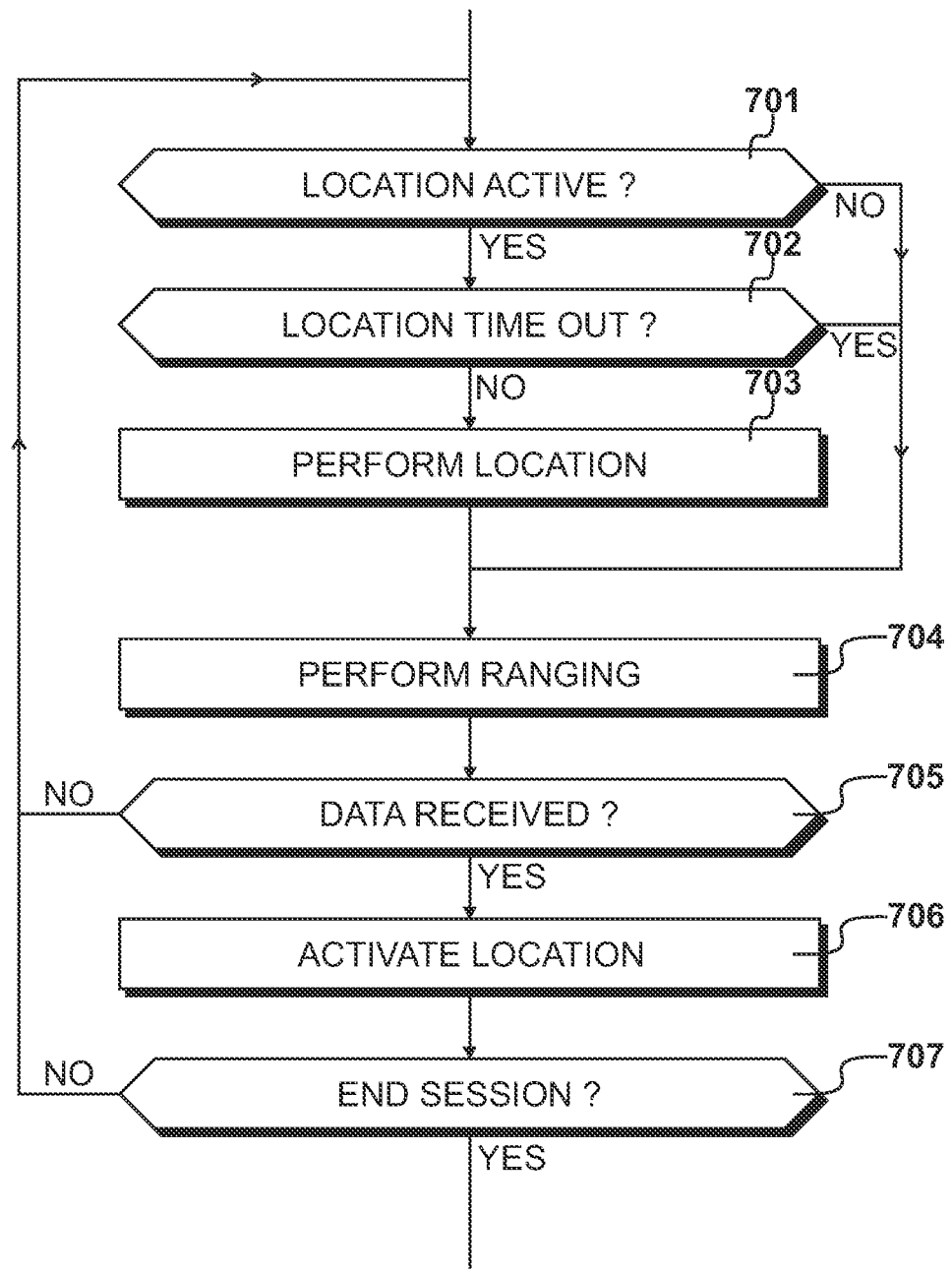
FIG. 7 shows procedures performed by the apparatus of FIG. 5.

A schematic representation of an example of a tag is shown in FIG. 5 and the equipment is substantially similar for an anchor.

The device has a first transmitter 501 along with a first receiver 502 and a processing circuit 503. The transmitter 501 includes a crystal oscillator 507 supplying a phase locked loop 508 which in turn receives control signals from the processing circuit 503. A modulated output from the phase locked loop 508 is supplied to an output power amplifier 509 prior to being supplied to the antenna.

The processing circuit 503 supplies transmitter control signals on a transmitter control line 510. Transmitter status is returned to the processing circuit 503 from the transmitter via a transmitter status line 511. Having performed a ranging exchange, transmission characteristics may be modified.

In the receiver 502, a mixer 512 receives an output from the phase locked loop 508. When receiving, the antenna supplies an input signal to a low noise amplifier 513 and the output from this low noise amplifier is supplied to the mixer 512 before being conveyed to an analog-to-digital converter 514 for application to the processing circuit 503. The processing circuit 503 receives details of receiver status on a receiver status line 515. Furthermore, the processing circuit 503 supplies receiver control signals to the receiver on a receiver control line 516.

Each tag receives power via a power regulator 521. To detect movement of moving tags, an accelerometer 522 provides data indicating movement. This allows an assessment to be made to the effect that the movable tag has not actually moved and as such, measured distances represent the same actual distance and may be averaged to improve accuracy.

The embodiment is also provided with a pressure sensor 523 that is sufficiently sensitive to provide an indication of changes in altitude. Thus, for a movable tag, a pressure change may indicate that a person or an asset has moved, or has been moved, between floors. In this way, it is possible for the processing circuit 503 to be configured to compensate assessed distances with respect to vertical displacements, such that subsequent processing of the position data may be performed upon two-dimensional position data.

FIG. 6

An abstracted representation of the environment described with reference to FIG. 5 is shown in FIG. 6. In this, the tag has a physical transmitter/receiver 601 and two software stacks, identified as a LoRa stack 602 and a Bluetooth low energy (BLE) stack 603; the combination of the software stacks defining a mobile access layer 604. Thus, there is a LoRa MAC and a Bluetooth MAC with both talking to the same physical transmitter/receiver. However, at any instant, the physical layer can only deploy one protocol or the other.

In practice, as illustrated at 611, the signal can be interleaved. Thus, after performing the LoRa ranging 612, it is possible to send a Bluetooth beacon 613. These operations are then repeated such that they fall within a first period 621, followed by second period 622 followed by a third period 623.

This approach is facilitated by the presence of a queue inside the device that deals with the launching of these transmissions. Thus, in this way, the LoRa communication can stay on and receive packets while the BLE beacon is also on. Thus, as shown in FIG. 6, there can be a burst of LoRa signal 612 and then a burst of BLE signals 613.

Possibly, in an attempt to run at the lowest possible power levels, an embodiment could switch to exclusively operating in accordance with the first radio protocol (LoRa) to exclusively operating in accordance with the second radio protocol, Bluetooth low energy. However, if the LoRa protocol is switched off, it becomes more difficult to communicate with the device because it is then only possible to communicate by Bluetooth.

Thus, in an embodiment, the BLE beacon is only used for the purpose of locating the position of a tag in a previously identified vicinity and is not used for any form of data communication. The control interface continues to communicate via the LoRa network and this can be used to turn off the BLE beacon. Alternatively, a timeout may be provided for deactivating the BLE beacon. Furthermore, it should also be appreciated that this second mode of operation is not used very often, therefore the additional power consumption is negligible.

LoRa ranging has a high bandwidth requirement compared to the sending of control signals. Thus, ranging activities may be deactivated while leaving the control functionality in place. Thus, in a refinement, it is the LoRa control interface that always stays on but LoRa ranging activities, for identifying the vicinity of the tag, are disabled while the actual position of the tag in the vicinity is being located, by means of the portable radio receiver using the second radio protocol.

The network data processor 154 has a LoRa stack and an application sits on top of that. In addition, on top, there is a user interface. This user interface allows an operative to make a selection to facilitate locating the position of a tag following an identification of its vicinity. The LoRa environment makes it possible to send data to and from these radio devices. It receives data, status information and sends control information.

Control signals can be generated by the system or by an operative. In this environment, an operative-initiated instruction ripples through the network, eventually telling the tag to become active. Thus, upon instructing the tag to change mode at step 302, the tag continues to send data back but it also sends Bluetooth signals out (to anyone) whereupon an operative may initiate listening for beacons using a suitable device. Thus, in this embodiment, there is no actual two-way communication at the Bluetooth level but the beacon signals include a user identification from which it is possible to individually identify each tag.

When using the first (LoRa) radio protocol, the devices are operating in class B mode, so that they are synchronized to a synchronization signal produced every one-hundred-and-twenty-eight seconds. Within each of these one-hundred-and-twenty-eight second windows, there are eight slots during which the main network server 152 can communicate with a radio. Eight times during each one-hundred-and-twenty-eight second window, each tag will listen for a packet from the server. Thus, because the positions of the received windows are known, it is possible to interleave the transmissions as shown in FIG. 6. Thus, the procedures are such as to avoid certain timeslots, which therefore provides for bidirectional communication. In this way, control of the tags is maintained within the LoRa control system which, for example, returns battery status information, other status information and data via the LoRa environment.

FIG. 7

As used herein, ranging refers to individual radio transmissions that allow return time-of-flight calculations to be made. On each cycle, many ranging operations of this type may be performed to make an evaluation of distance from a specific anchor to a specific tag. In accordance with an aspect of the present invention, it is appreciated that these distances include errors and as such may only facilitate an identification of the vicinity of the tag in a radio network.

Referring to FIG. 2, the vicinity may be assumed to be one of the available rooms. Thus, performing step 301 may have resulted in an identification to the effect that a tag is present within room 212. The actual position of the tag is then located in this vicinity (room) by means of a portable radio receiver, using a second radio protocol. Thus, as used herein, ranging is performed to identify a vicinity, with the second radio protocol being used to identify an actual location.

At step 701, a question is asked as to whether location protocols are active. Usually, this question will be answered in the negative, such that step 702 and step 703 are bypassed.

At step 704, ranging operations, in accordance with the first protocol, are performed, whereafter, at step 705, a question is asked as to whether data has been received. Usually, this will be answered in the negative and control will be returned to step 701.

On the next iteration, the question asked at step 701 will again be answered in the negative, such that ranging operations are performed at step 704. As previously described, windows are created during which control data may be sent to selected tags. The radio network is synchronized to a clock signal, such that the tag maintains real-time synchronization. Data transmissions from the tag using the first radio protocol occur within first time slots. Broadcast transmissions from the tag, using the second radio protocol, occur during second time slots and the second time slots are displaced from the first time slots.

The first radio protocol transmits and receives ranging signals from which ranges are calculated with reference to the time taken for a transmission to take place. The ranging signals measure a return time-of-flight, comprising a measurement of the time taken for a signal to be transmitted from a first fixed transceiver to the mobile radio enabled tag plus the time taken for a response signal to be transmitted from the mobile radio enabled tag back to the first fixed transceiver.

When a specific tag is to be located, a message is sent to the tag, in accordance with the first radio protocol, instructing the tag to broadcast a radio signal in accordance with the second radio protocol; thereby making location detection active. Thus, after performing ranging operations at step 704, a question is asked at step 705 as to whether vicinity data has been received. When answered in the negative, the tag cannot be found and control is returned to step 701. However, if the question asked at step 705 is answered in the affirmative, to the effect that the vicinity of the tag has been identified, location detection is activated at step 706.

A question is asked at step 707 as to whether the session is to end. On this iteration, the question asked at step 707 is answered in the negative and control is returned to step 701. The question asked at step 701 is answered in the affirmative, given that location detection was activated at step 706. Thus, at step 703, location detection is performed resulting in a BLE transmission 613. Ranging is then performed at step 704, resulting in a LoRa data transmission 612. Thus, further iterations will result in location detection being performed at step 703 and possibly ranging operations being performed at step 704, until a timeout occurs or a new instruction is issued to stop location detection, which will then result in the question asked at step 701 being answered in the negative.

FIG. 8

Figure 8:
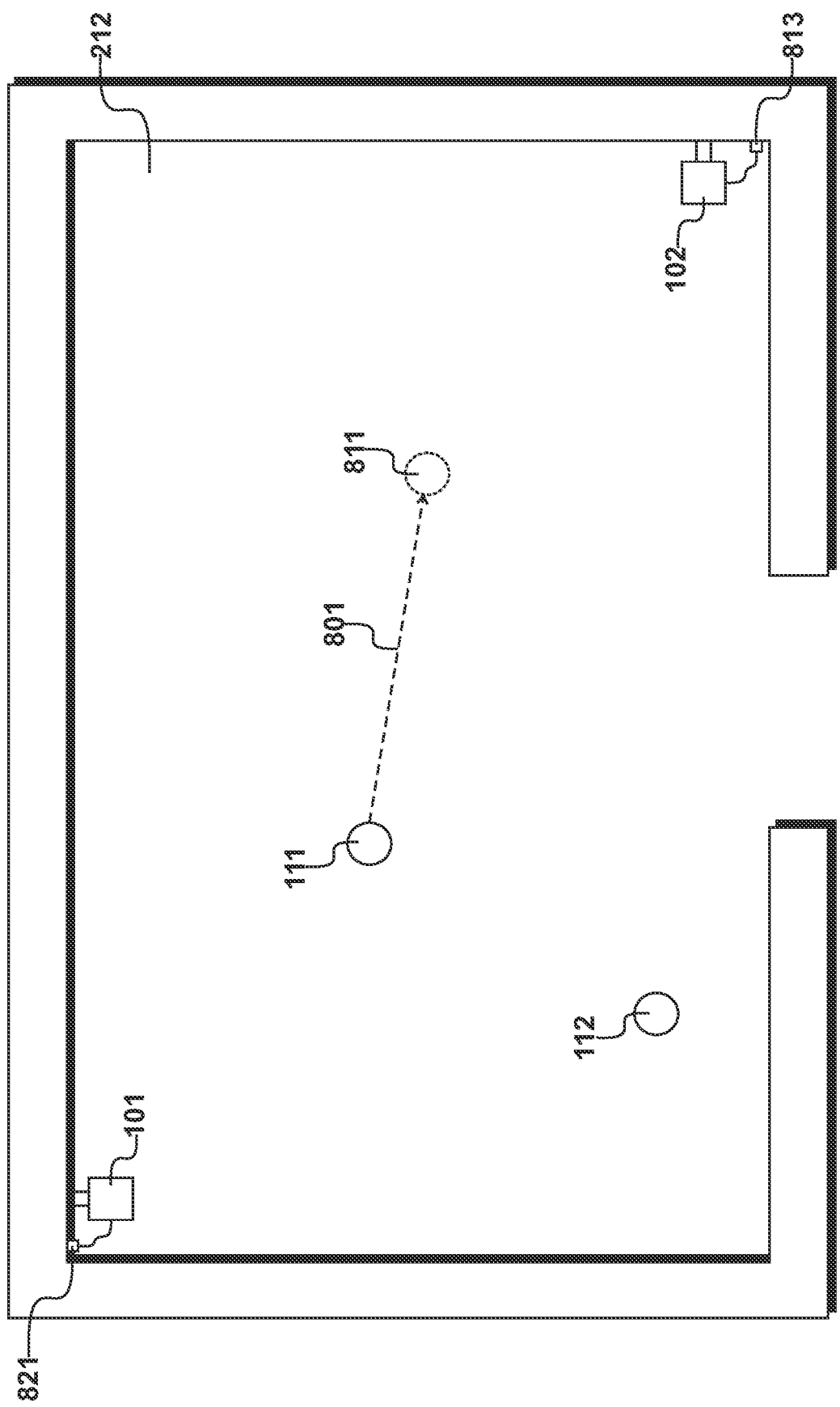
FIG. 8 details a room identified in FIG. 2.

Room 212 is shown in greater detail in FIG. 8. For the purpose of this example, the first tag 111 is located within room 212, along with the second tag 112. The first tag may move in the direction of dashed arrow 801 to a new location 811, while the second tag 112 remains stationary.

A single specific radio transmission and retransmission allows a single range to be calculated based on the return time-of-flight. In this embodiment, many ranging operations of this type are performed within a ranging interval using mutually different transmission characteristics. After considering all of these range values identified during a ranging interval, an individual distance is assessed, thereby producing a single distance output per iteration.

The first anchor 101 receives power from an external power supply 821, with a similar second external power supply 813 supplying power to the second fixed anchor 102. In an embodiment, power is derived from a power over ethernet system, on the basis that such a supply is likely to include an uninterruptible power supply and will therefore not experience a non-operational state should the general power supply fail. In an alternative embodiment, each anchor receives power from its own battery.

Ethernet connections to the anchors may also be used to establish communications with the network data processor 154. However, in an embodiment, all system data communications occur within the radio network itself. Furthermore, the radio network established for ranging purposes may also provide a platform for other data transmission applications. In this embodiment, the radio network follows established LoRa protocols to provide a long-range, low-power, wide area network based on spread spectrum modulation.

FIG. 9

Figure 9:
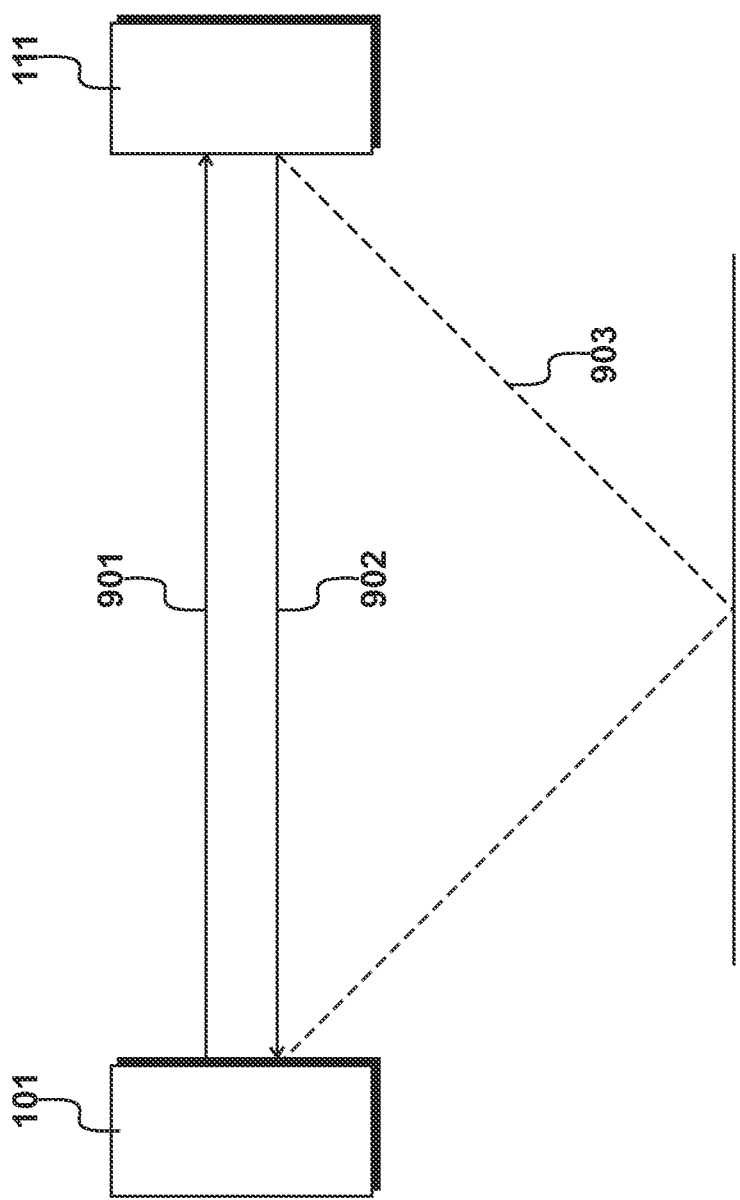
FIG. 9 illustrates a ranging operation.
Figure 10:
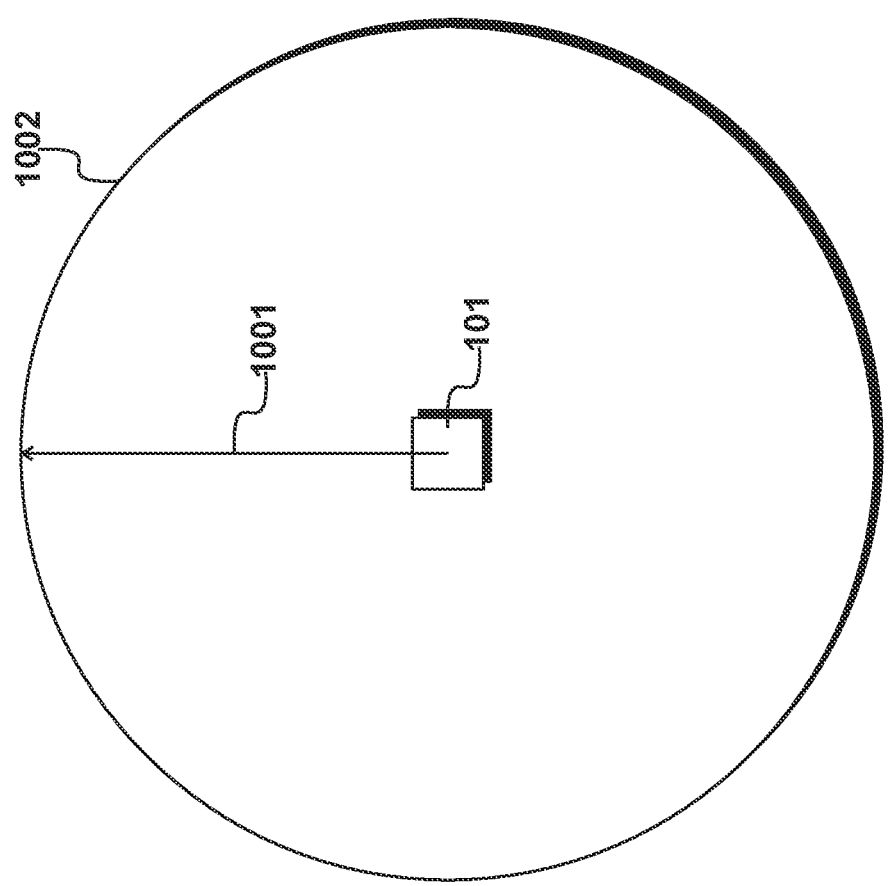
FIG. 10 identifies a single anchor.

The first fixed anchor 101 is shown in FIG. 9 performing a ranging operation with respect to the first mobile tag 111. In an embodiment, the fixed transceivers and the mobile transceivers are implemented as Semtech SX1280 devices, produced by Semtech Corporation of Camarillo, California, USA.

Ranging measurements are made between the first anchor 101 and the first mobile tag 111 by measuring the time taken for a radio signal 901 to be transmitted from the anchor 101 to the tag 111 and then the time taken for a second radio signal to be returned back, by being transmitted by the second tag 111 and received by the first anchor 101. Measured durations are then converted to ranges with reference to the speed of propagation.

Time-of-flight calculations of this type provide accurate measurements when transmissions occur in the direction of line-of-sight, as indicated by the first propagation path 901 and the second propagation path 902. However, problems with this approach can occur due to the presence of reflections. Thus, as an alternative to adopting the second transmission path 902, for example, the return communication could adopt a third transmission path 903, resulting in a longer transmission time and a resulting erroneous evaluation of range.

To mitigate these issues, in an embodiment, each distance assessment does not rely upon a single evaluation of range. In particular, in an embodiment, many ranging transmissions are made using different transmission frequencies; or more specifically, different chirps within the Chirp Spread Spectrum technology of LoRa. Furthermore, mutually orthogonally displaced antennas may be deployed from which the group of ranges providing shorter distances are selected in preference to those providing longer distances.

Within the established radio protocol, each anchor may be established as a ranging master, which then performs raging operations with a mobile tag identified as a ranging slave. To determine the range of the slave from the master, the ranging master 101 sends a ranging request to the ranging slave 111, which in turn returns a synchronized response back to the master. The master measures and interpolates the time elapsed between the ranging request and the response, such that the measured time reported by the master is the round-trip time between the master and slave. The resulting measured time is therefore indicative of the round-trip distance with additional timing errors. Protocols within the devices themselves attempt to compensate for these errors, resulting in the generation of output data representing an assessment of the distance between the slave transceiver and the master transceiver.

FIG. 10

Anchor 101 is shown in FIG. 9, that is capable of communicating with the tags in the environment to assess distances between the anchor 101 and the tags, such as tag 111. The actual location of the tag is unknown and the objective is to locate the position of this mobile transceiver within the environment. The environment itself may be a hospital or a care home with mobile transceivers attached to residents. Alternatively, or in addition, mobile tags may be attached to particular assets, such that these assets may be located for maintenance purposes.

It is possible to use the first protocol to identify a specific location of a tag, such that an operative would then be in a position to accurately locate the tag. However, an aspect of the present invention adopts an alternative approach. The first radio protocol is deployed not to identify an accurate position but to identify a vicinity. A second protocol is then deployed to identify an accurate position within this vicinity. Thus, for example, the vicinity may be room 212 and once this vicinity has been identified within a relatively large environment, the second protocol may be used to identify an actual location.

Radio transmissions used to assess distances are unidirectional, such that having identified a particular distance, this should be considered as a radius 1001, indicating that a mobile tag may be located anywhere along a circumference 1002.

In an embodiment, distances have been assessed from ranging data, derived from measured return times-of-flight. However, the approach for specifying a vicinity is not restricted to the way in which the distance data is actually assessed. Thus, other techniques could be deployed that are appropriate to identifying vicinities within relatively large environments, such as time of difference of arrival, in which a tag would broadcast a signal and each anchor would record a time of arrival.

FIG. 11

Figure 11:
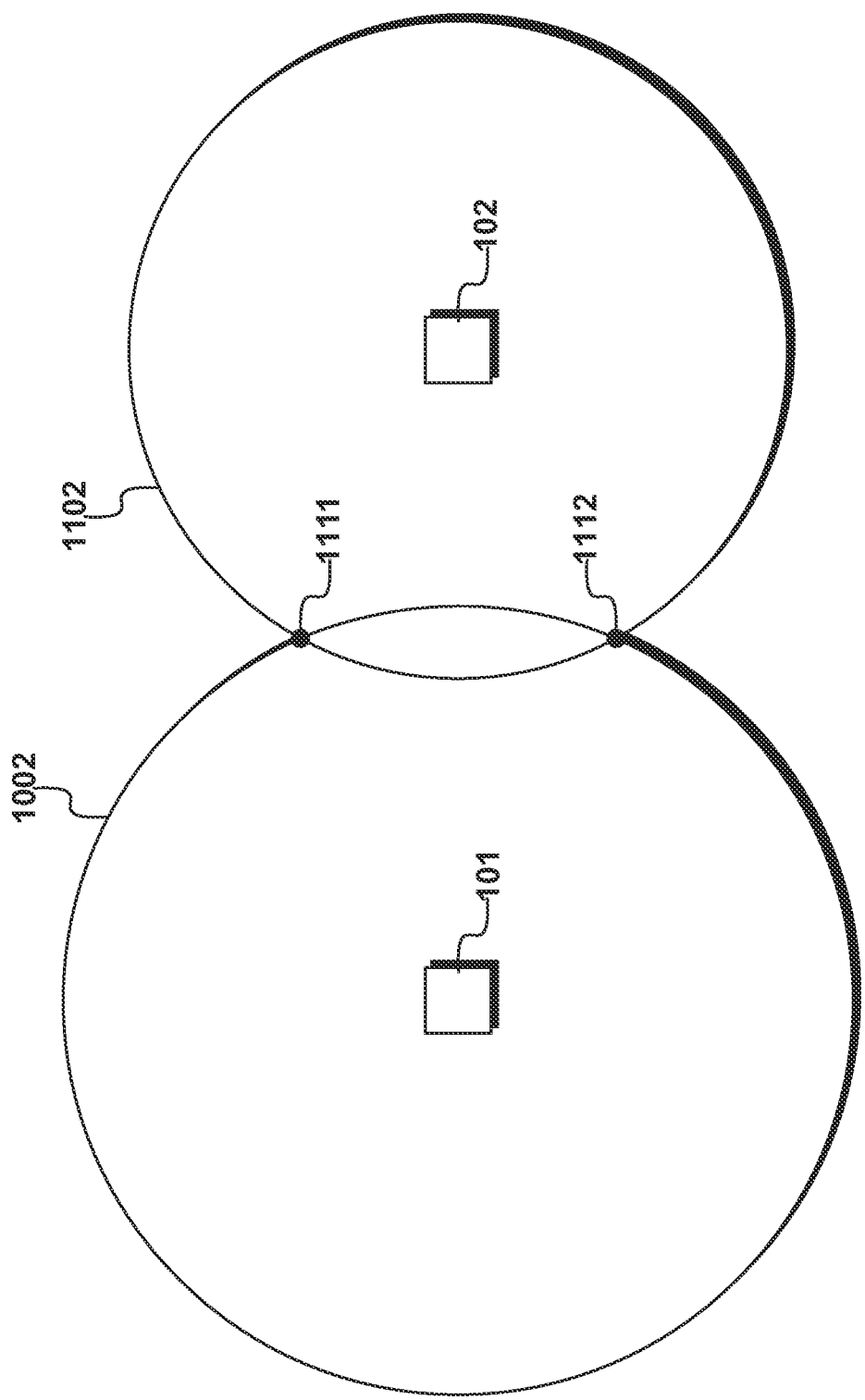
FIG. 11 introduces a second anchor.

The second anchor 102 is shown in addition to the first anchor 101 in FIG. 11. As previously described, anchor 101 has specified that the position of the tag is somewhere on circumference 1002. In a similar way, the second anchor 102 has specified that the position of the tag is somewhere on a second circumference 1102. It may therefore be assumed that the tag should be located where the circles intersect. Thus, the tag should be located at a first position 1111 or at a second position 1112.

FIG. 12

Figure 12:
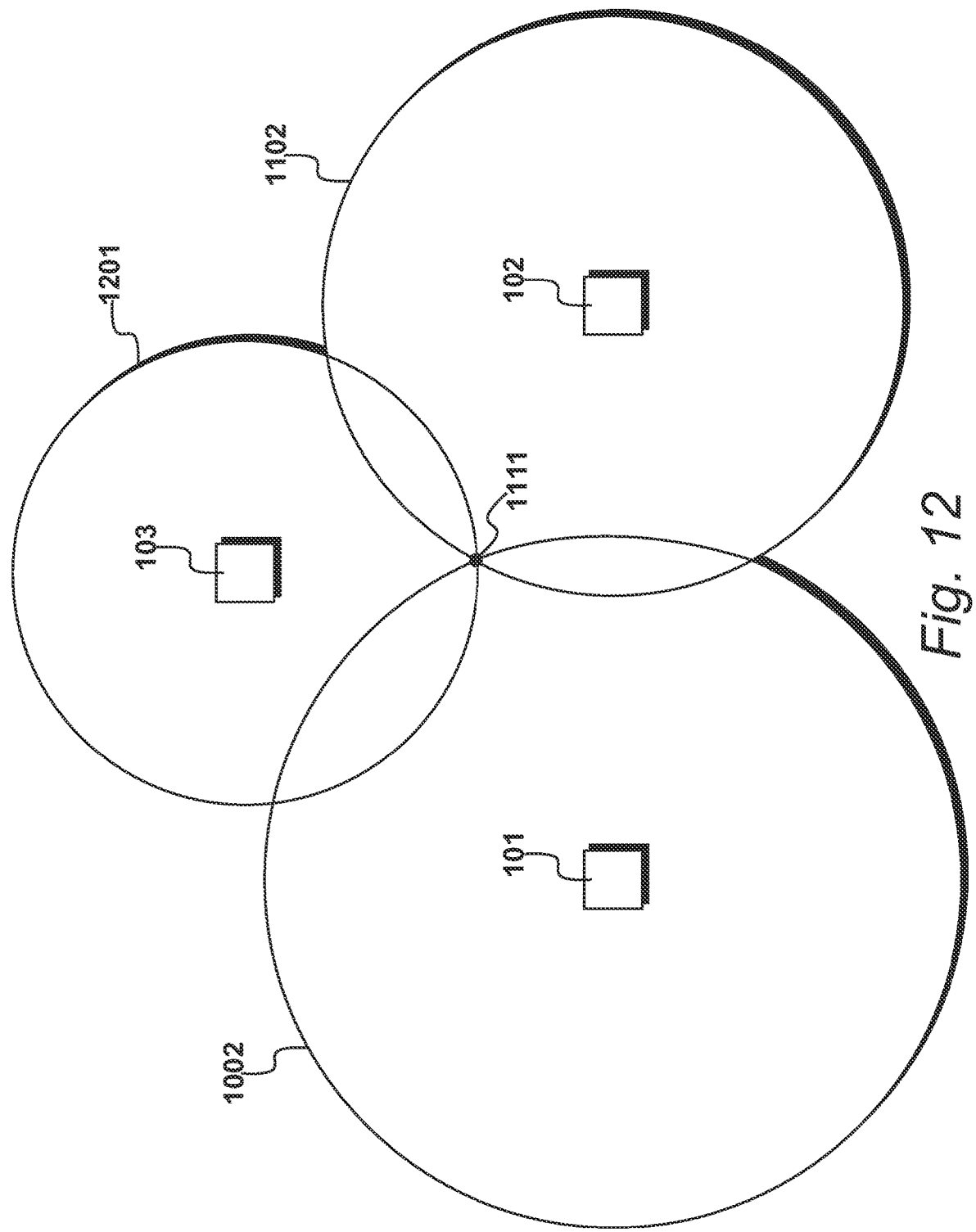
FIG. 12 introduces a third anchor.

The introduction of a third anchor results in the establishment of a third circumference 1201, which intersects position 1111 and not position 1112. Thus, with these anchors in place, it should be possible, in theory, to accurately locate the tag, as shown in FIG. 12, at position 1111.

FIG. 13

Figure 13:
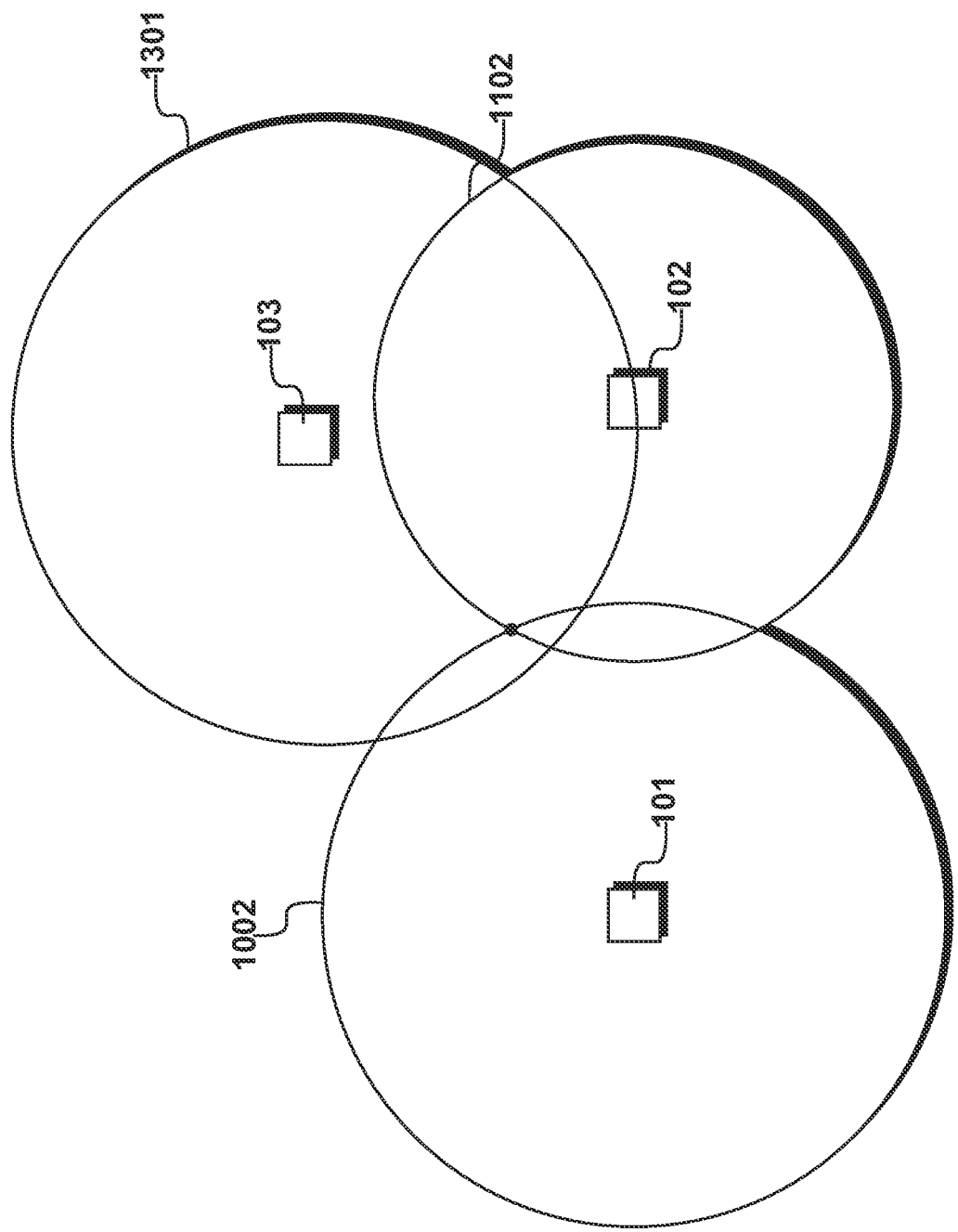
FIG. 13 illustrates the introduction of errors when using three anchors.

In practice, the range data includes errors such that, as illustrated in FIG. 13, the provision of three anchors is unlikely to result in a clear identification of a single location. In this example, the third anchor has assessed a distance that defines a circumference 1301, instead of circumference 1201. Consequently, a clear intersection of three circles does not exist.

Errors of this type are introduced due to the presence of reflections. Accuracy can be improved by providing more anchors but the present invention seeks to avoid this expense by adopting a second procedure for identifying a specific location after the ranging data has been processed to identify a vicinity, as distinct from a precise location.

FIG. 14

In addition to return time-of-flight ranging within the LoRa environment, the present invention introduces another mechanism for finding a tag. When an operative is about ten metres away, it is possible to switch to an alternative mechanism. Normally, the tag is doing LoRa ranging. However, by providing an operative with a wireless and Bluetooth enabled tablet 1401 (or mobile phone), it is possible to accurately locate the position of the tag, having used the LoRa protocol to identify the vicinity of the tag.

Thus, in an embodiment, the tag is effectively converted into a Bluetooth transmitter. The Bluetooth signals are then picked up by the tablet 1401. As the operative moves closer or further away from the tag, it is possible to detect this by an increasing or decreasing signal strength. Thus, the present embodiment provides a ranging mechanism that uses two different technologies, with the tag switching between these modes of operation.

The ability to turn the tag into a Bluetooth beacon is particularly useful if there is a sparse distribution of anchors or if the apparatus has been deployed in an environment, such as a mineshaft, where there is a great deal of radio reflection. The present embodiment uses Bluetooth as the second radio protocol but other radio protocols could be deployed such as ultra-wideband.

It is not desirable for the beacon function to remain active. A procedure may be initiated by an operative to locate a tag via the control application running on the application server 153. This may occur directly using a graphical interface displayed by the application server 153. Alternatively, an instruction may be initiated via mechanical interaction upon a touchscreen 1402 of the tablet 1401 to communicate with the application server 153. Thus, a graphical user interface may be displayed on the touchscreen 1402 allowing a specific tag to be identified and for location operations to be initiated in order to facilitate the location of the tag.

In response to initiating a procedure to locate a tag, ranging operations are activated to identify the vicinity of the tag at step 301. Thereafter, the specific tag is instructed to change its mode of operation at step 302 becoming, in an embodiment, a Bluetooth beacon.

The beaconing operation is only done for a short period of time, so as not to unnecessarily deplete the battery. Even if a tag is only ten metres away, it can still be difficult to find. Thus, the present approach makes it much easier to find while introducing very little in terms of additional infrastructure.

An alternative approach would be to have a mobile anchor. However, in many environments, operatives will already be in possession of mobile devices (tablets and mobile phones) capable of receiving the Bluetooth beacon signals. Devices of this type tend to be routinely charged whereas, if a specific mobile beacon is provided, there is a risk that this could be less than operational at a time when it is required for deployment.

Situations may also exist when it is necessary to remove all existing tags from an environment before new tags, or equipment for a totally unrelated activity, are introduced.

FIG. 15

Figure 14:
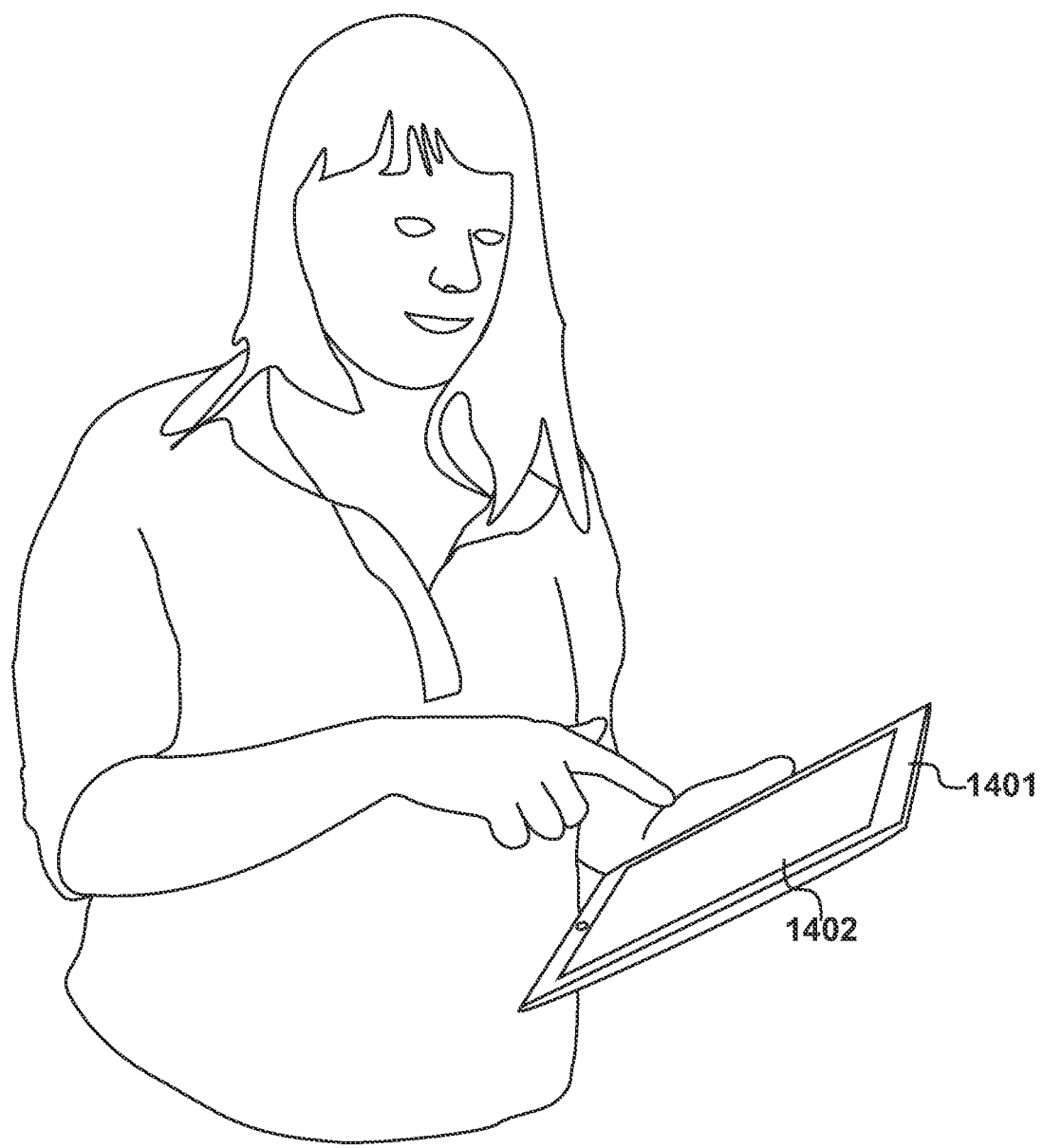
FIG. 14 shows the use of a tablet for picking up broadcasted signals in accordance with the second protocol.
Figure 15:
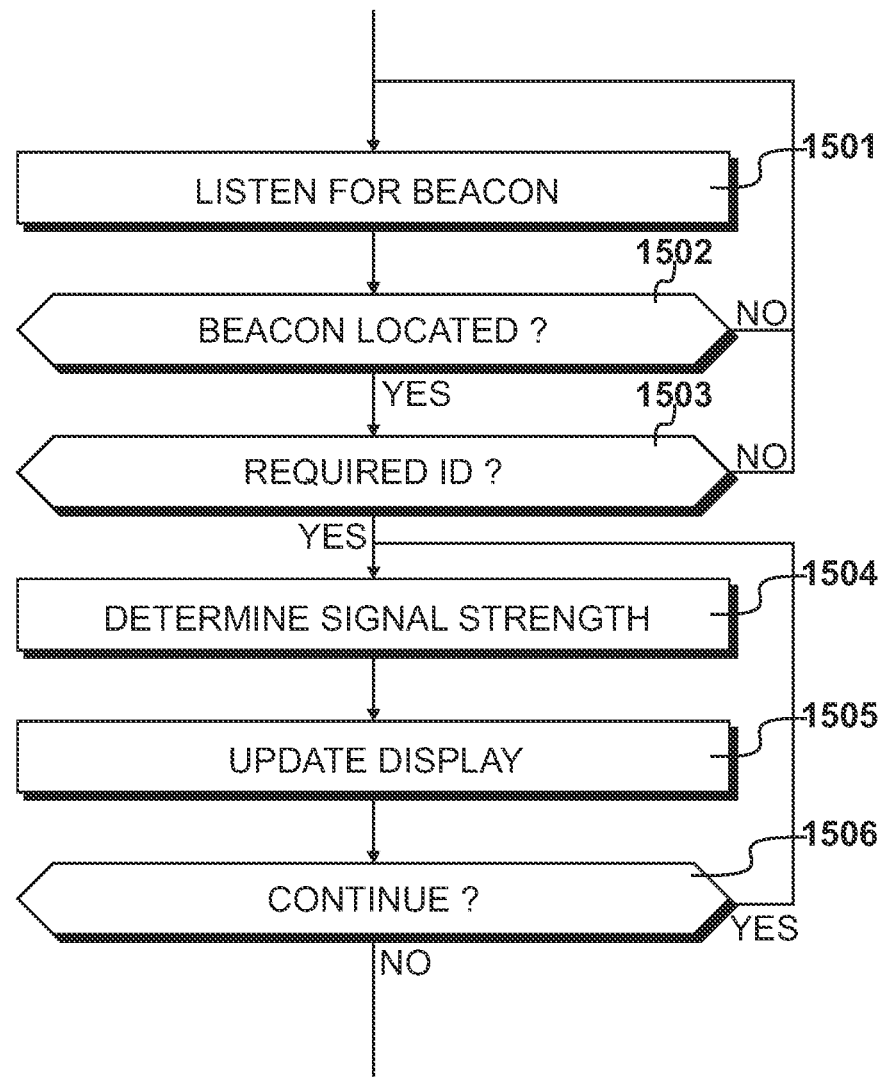
FIG. 15 illustrates operations performed on the device shown in FIG. 14.

As described with reference to FIG. 14, an operative may interact with a mobile tablet 1401 to initiate procedures for identifying the location of a tag. At the tablet 1401, this may result in two things occurring. Firstly, an instruction is sent to the network server 152 which in turn instructs the application server 153 to identify the vicinity of a selected tag. Secondly, specific procedures are implemented on the tablet 1401 itself such that, having received an indication of the vicinity of the tag, the tablet may be deployed to identify a specific location within that vicinity.

As previously described, the application server 153 instructs the tag to activate location detection at step 706.

Location operations are then performed at step 703 which results in the broadcasting of BLE Beacons, as described with reference to FIG. 6.

At the tablet, a local Bluetooth receiver is activated to listen for the beacon signal at step 1501. A question is then asked at step 1502 as to whether a beacon has been located and when answered in the negative, the device continues to listen for the beacon signal at step 1501.

If the question asked at step 1502 is answered in the affirmative, to the effect that a beacon has been located, a question is asked at step 1503 as to whether the required identification is being transmitted. Again, if the question asked at step 1503 is answered in the negative, control returns to step 1501 and the device continues to listen for a beacon signal.

If the question asked at step 1503 is answered in the affirmative, the signal strength of the received signal is determined at step 1504. The beacon signal also includes power information which identifies the amplitude of the transmitted power. This information is used, in combination with an actual measurement of signal strength, to determine an estimation of distance.

A graphical interface is displayed on the touchscreen 1402 and at step 1505 this display is updated to provide an indication to the user as to how close they are to the tag. A question is then asked at step 1506 as to whether the procedure is to continue and when answered in the negative, the process terminates in anticipation of a redeployment. When the question asked at step 1506 is answered in the affirmative, a further determination of signal strength is made allowing the display to be updated at step 1505.

FIG. 16

Figure 16:
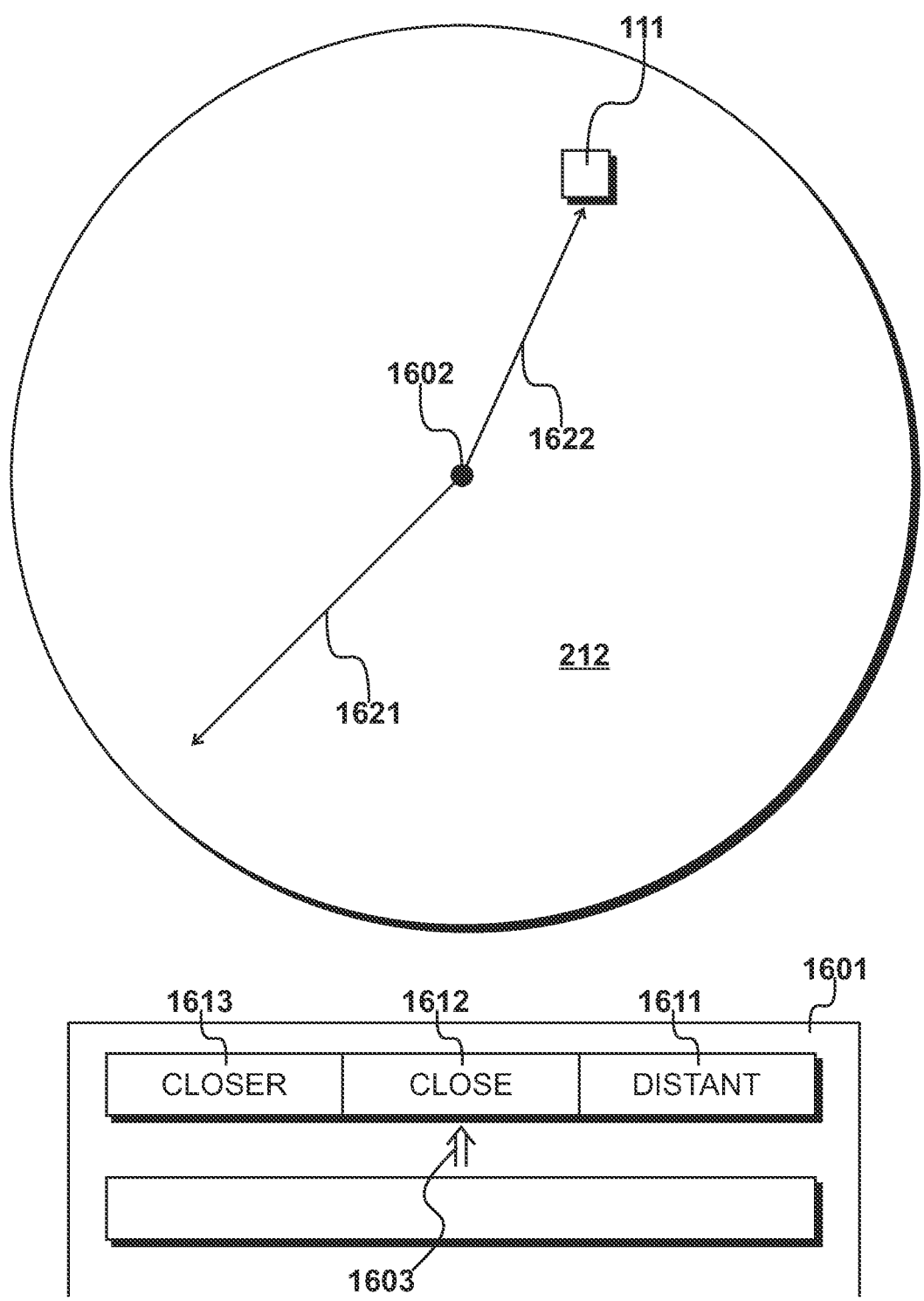
FIG. 16 illustrates a graphical user interface of the type displayed on the apparatus identified in FIG. 14.

An example of a graphical user interface 1601 displayed on the touchscreen 1402 is shown in FIG. 16. A schematic representation of tag 111 is also shown in FIG. 16. For the purposes of this example, it may be assumed that the first radio protocol has identified the vicinity of tag 111 and an operative will have received a notification to the effect that the tag should be somewhere in room 212. The operative enters room 212 and may be assumed to be standing at an identified position 1602.

In an embodiment, the graphical user interface 1601 may attempt to provide an actual indication of distance. However, in an embodiment, it is unlikely that this level of accuracy would be required, given that the first procedures have already identified the vicinity of the tag, such that the operative now knows that the tag is somewhere in room 212. In this embodiment, the graphical user interface includes a pointer 1603 which moves to the left when signal strength increases, indicating that the operative is getting closer to the tag and moves to the right when the signal strength decreases, indicating that the operative is moving away from the tag.

In this embodiment, three regions are also identified which, from the right moving to the left show that the tag is distant in a first region 1611, close in a second region 1612 or closer in a third region 1613. Experiments have shown that when the pointer 1603 reaches the third region 1613, tags should easily be identified by unaided visual inspection.

For the purposes of illustration, it may be assumed that the operative firstly moves in the direction of a first arrow 1621. As can be seen in FIG. 16, this results in the operative moving away from the tag 111, therefore the pointer 1603 will move to the right.

Similarly, as the operative moves in the direction of a second arrow 1622, the pointer 1603 will move to the left as the operative gets closer to the tag. In embodiments, it is also possible for audio signals to be generated, such that the volume or the pitch of an audio signal may increase as the operator gets closer to the tag.

Thus, by deploying this second protocol, operatives should be in a position to quickly locate the position of a tag after they have received information identifying the tag's vicinity.

To determine direction, effectively identifying the direction of the second arrow 1622, it is necessary to move the handheld device. However, in an alternative embodiment, equipment is included to assess the angle of arrival of the Bluetooth signal, such that a graphical display could provide directional information, in addition to amplitude information, thereby showing the operative a specific direction, such as along the direction of the second arrow 1622, to locate the tag.

The invention claimed is:

1. A method of locating a mobile radio-enabled tag, comprising steps of:
   identifying a vicinity of said mobile radio-enabled tag in a radio network having fixed radio transceivers using a first radio protocol, in which said fixed radio transceivers continually perform return time of flight ranging exchanges with a plurality of mobile radio-enabled tags in an environment to determine distances between each of said plurality of mobile radio-enabled tags and a plurality of said fixed radio transceivers;
   uploading said distances using said first radio protocol; and
   locating a position of said mobile radio-enabled tag in said vicinity by means of a portable radio receiver using a measurement of signal strength of a second radio protocol, in which a message issued to said mobile radio-enabled tag to locate is instructed by a fixed radio transceiver under said first radio protocol to broadcast a location signal in accordance with said second radio protocol,
   wherein said position is located by measuring a signal strength of said location signal.

2. The method of claim 1, wherein said mobile radio-enabled tag maintains first radio protocol communications within said radio network, while also operating in accordance with said second radio protocol.

3. The method of claim 2, wherein:
   said radio network is synchronized to a clock signal, such that said mobile radio-enabled tag maintains real time synchronization;
   data transmissions from said mobile radio-enabled tag using said first radio protocol occur within first time slots;
   broadcast transmissions from said mobile radio-enabled tag using said second radio protocol occur within second time slots; and
   said second time slots are displaced from said first time slots.

4. The method of claim 1, wherein:
   said first radio protocol transmits and receives ranging signals from which ranges are calculated with reference to a time taken for a transmission to take place; and
   each ranging operation is initiated by one of said fixed radio transceivers.

5. The method of claim 4, wherein said ranging signals measure a return time of flight, comprising a measurement of:
   a time taken for a signal to be transmitted from a first fixed transceiver to said mobile radio-enabled tag; plus a time taken for a response signal to be transmitted from said mobile radio-enabled tag back to said first fixed transceiver.

6. The method of claim 5, wherein:
said radio network comprises a plurality of tags;
distances are determined between said fixed radio transceivers and said plurality of tags by averaging a plurality of ranging results; and
vicinities are evaluated with reference to said distances.

7. The method of claim 6, wherein:
each distance of said distances is assessed with reference to a plurality of actual return time of flight calculations; and
a plurality of distances are combined for each uploading operation.

8. The method of claim 1, wherein said second radio protocol comprises steps of:
broadcasting a signal periodically from said mobile radio-enabled tag having a predetermined transmission signal level;
receiving broadcasted signals from said mobile radio-enabled tag at a mobile device; and
generating output data at said mobile device indicating a strength of said broadcasted signals.

9. An apparatus for locating a mobile radio-enabled tag, comprising:
a radio network having a plurality of fixed radio transceivers configured to operate under a first radio protocol to identify a vicinity of said mobile radio-enabled tag in said radio network; and
a portable radio receiver configured to locate a position of said mobile radio-enabled tag in said vicinity using a second radio protocol, wherein a network data processor is configured to:
instruct said plurality of fixed radio transceivers to continually perform return time of flight ranging exchanges with a plurality of mobile radio-enabled tags in an environment;
upload distance data using said first radio protocol from which said vicinity is located;
having located said vicinity of said mobile radio-enabled tag to be located, issue a message to said mobile radio-enabled tag via a fixed transceiver under said first radio protocol to broadcast a location signal in accordance with said second radio protocol; and
measure signal strength of said location signal transmitted in accordance with said second radio protocol.

10. The apparatus of claim 9, wherein said mobile radio-enabled tag is configured to maintain first radio protocol communications within said radio network, while also operating in accordance with said second radio protocol.

11. The apparatus of claim 10, wherein:
said radio network is synchronized to a clock signal and said mobile radio-enabled tag is configured to maintain real time synchronization;
data transmissions from said mobile radio-enabled tag using said first radio protocol occur within first time slots;
broadcast transmissions from said mobile radio-enabled tag using said second radio protocol occur within second time slots; and
said second time slots are displaced from said first time slots.

12. The apparatus of claim 9, wherein:
said first radio protocol transmits and receives ranging signals from which ranges are calculated with reference to a time taken for a transmission to take place; and
each ranging operation is initiated by one of said plurality of fixed radio transceivers.

13. The apparatus of claim 12, wherein said ranging signals measure a return time of flight, comprising a measurement of:
a time taken for a signal to be transmitted from a first fixed transceiver to said mobile radio-enabled tag; plus
a time taken for a response signal to be transmitted from said mobile radio-enabled tag back to said first fixed transceiver.

14. The apparatus of claim 13, wherein:
said radio network comprises a plurality of tags;
distances are determined between said plurality of fixed radio transceivers and said plurality of tags by averaging a plurality of ranging results; and
vicinities are evaluated with reference to said distances.

15. The apparatus of claim 14, configured to assess each distance of said distances with reference to a plurality of actual return time of flight calculations, wherein a plurality of distances are combined for each uploading operation.

16. The apparatus of claim 9, wherein said radio network is configured to operate under said second radio protocol by:
broadcasting a signal periodically from said mobile radio-enabled tag having a predetermined transmission signal level;
receiving broadcasted signals from said mobile radio-enabled tag at a mobile device; and
generating output data at said mobile device indicating a strength of said broadcasted signals.

* * * * *